US012661291B2

(12) United States Patent
Li et al.

(10) Patent No.: US 12,661,291 B2
(45) Date of Patent: Jun. 23, 2026

(54) PLASTIC ELECTRIC LIFT DEVICE

(71) Applicant: INTRADIN (SHANGHAI) MACHINERY CO., LTD., Shanghai (CN)

(72) Inventors: Ping Li, Shanghai (CN); Xuetao Qiao, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 115 days.

(21) Appl. No.: 18/779,159

(22) Filed: Jul. 22, 2024

(65) Prior Publication Data

US 2024/0374445 A1 Nov. 14, 2024

(30) Foreign Application Priority Data

May 23, 2024 (CN) ......................... 202421143407.5

(51) Int. Cl.
*A61G 7/10* (2006.01)
*A47K 3/12* (2006.01)
(Continued)

(52) U.S. Cl.
CPC ............ *A61G 7/1059* (2013.01); *A47K 3/122* (2013.01); *A47K 3/282* (2013.01); *A61G 5/14* (2013.01);
(Continued)

(58) Field of Classification Search
CPC ...... A61G 7/1059; A61G 5/14; A61G 7/1003; A61G 7/1019; A61G 7/1074; A61G 5/0808; A61G 7/1011; A47K 3/122; Y10S 297/10
(Continued)

(56) References Cited

U.S. PATENT DOCUMENTS 5,708,992 A * 1/1998 Gobbers .............. A61G 7/1088 4/578.1
5,978,984 A * 11/1999 Gobbers .............. A61G 7/1059 4/565.1
(Continued)

FOREIGN PATENT DOCUMENTS

CA 2397503 C * 10/2010 ........... A61G 7/1019
CN 107049638 B 5/2018
(Continued)

OTHER PUBLICATIONS

Translation of DE 1970591 (Year: 2006).*
Text of DE 102004035286 A1 to Frank et al. (Year: 2006).*

*Primary Examiner* — Robert Canfield

(57) ABSTRACT

A plastic electric lift device includes a seat assembly, a folding assembly, an electric push rod assembly and a clamping assembly. The seat assembly includes a seat plate and a backrest rotatably connected thereto. The folding assembly is configured to support the seat assembly. The electric push rod assembly includes a main body and a push rod partially within the main body. The main body is provided at the backrest. The push rod has a push rod head removably provided at the folding assembly, and is configured to extend and retract along an axis of the main body, such that the main body drives the folding assembly to expand or fold to drive the seat assembly to ascend or descend. The clamping assembly is configured to limit the push rod head to the folding assembly or to release the push rod head from the folding assembly.

9 Claims, 21 Drawing Sheets

(51) Int. Cl.
*A47K 3/28* (2006.01)
*A61G 5/10* (2006.01)
*A61G 5/14* (2006.01)

(52) U.S. Cl.
CPC ......... *A61G 7/1003* (2013.01); *A61G 7/1019* (2013.01); *A61G 7/1074* (2013.01); *Y10S 297/10* (2013.01)

(58) Field of Classification Search
USPC ............... 4/565.1, 564.1, 578.1; 297/344.12, 297/344.15–344.17, 378.12, DIG. 10
See application file for complete search history.

(56) References Cited

U.S. PATENT DOCUMENTS

| | | | | |
|---|---|---|---|---|
| 7,802,326 | B2 * | 9/2010 | Kempter | A61G 7/1074 4/560.1 |
| 10,034,809 | B2 * | 7/2018 | Kimmerle | A47K 3/122 |
| 11,596,564 | B2 * | 3/2023 | Smith | A47K 3/122 |
| 2003/0172452 | A1 * | 9/2003 | Wihlborg | G01N 15/1433 4/565.1 |
| 2005/0166312 | A1 * | 8/2005 | Cancian | A47K 3/282 4/604 |
| 2007/0011804 | A1 * | 1/2007 | Kempter | A61G 7/1074 4/560.1 |
| 2017/0231845 | A1 * | 8/2017 | Kimmerle | A61G 7/1003 4/564.1 |
| 2020/0390626 | A1 * | 12/2020 | Kempter | A61G 7/1088 |
| 2021/0186785 | A1 * | 6/2021 | Smith | A61G 7/1019 |

FOREIGN PATENT DOCUMENTS

| | | | | | |
|---|---|---|---|---|---|
| CN | 113425519 | A | | 9/2021 | |
| DE | 19701591 | A1 | * | 7/1998 | B66F 7/065 |
| DE | 102004035286 | A1 | * | 2/2006 | A61G 7/1019 |
| EP | 1285645 | B1 | * | 12/2005 | A61G 7/1003 |

* cited by examiner

PLASTIC ELECTRIC LIFT DEVICE

CROSS-REFERENCE TO RELATED APPLICATIONS

This application claims the benefit of priority from Chinese Patent Application No. 202421143407.5 filed on May 23, 2024. The content of the aforementioned application, including any intervening amendments made thereto, is incorporated herein by reference in its entirety.

TECHNICAL FIELD

This application relates to standing aids, and more particularly to a plastic electric lift device.

BACKGROUND

The lift is designed to aid people with limited mobility, such as elderly people and paralyzed patients, to independently move and stand during the rehabilitation process. However, most of the existing stand assist lifts have a large space occupation, resulting in inconvenient storage and transfer.

SUMMARY

Based on this, the main purpose of the present disclosure is to provide a plastic electric lift device with convenient storage and transfer.

The technical solutions of the present disclosure will be specifically described as follows.

This application provides a plastic electric lift device, comprising:

a seat assembly;

a folding assembly;

an electric push rod assembly; and a clamping assembly;

wherein the seat assembly comprises a seat plate and a backrest; the backrest is rotatably connected to the seat plate;

the folding assembly is configured to support the seat assembly;

the electric push rod assembly comprises a main body and a push rod; the push rod is partially provided within the main body; the main body is provided at the backrest; the push rod is provided with a push rod head; the push rod head is removably provided at the folding assembly; the push rod is configured to extend and retract along an axial direction of the main body, such that the main body drives the folding assembly to become unfolded or folded, so as to drive the seat assembly to ascend or descend; and the clamping assembly is configured to limit the push rod head to the folding assembly or to release the push rod head from the folding assembly, so as to achieve a removable arrangement of the push rod head relative to the folding assembly.

In an embodiment, the folding assembly comprises a base plate and a crisscross arm mechanism;

the crisscross arm mechanism is provided at the base plate; and the crisscross arm mechanism is configured to support the seat plate.

In an embodiment, the crisscross arm mechanism comprises a first connecting arm and a second connecting arm hinged to each other;

the first connecting arm is provided with a first hinged end and a first sliding end;

the first hinged end is hinged to the base plate;

the first sliding end is slidably provided at a bottom of the seat plate;

the second connecting arm is provided with a second hinged end and a second sliding end;

the second hinged end is hinged to the bottom of the seat plate;

the second sliding end is slidably provided at the base plate; and the push rod is configured to extend along the axial direction of the main body to drive the first sliding end to move away from the second hinged end and drive the second sliding end to move away from the first hinged end, so as to unfold the folding assembly; and the push rod is also configured to retract along the axial direction of the main body to drive the first sliding end to move close to the second hinged end and drive the second sliding end to move close to the first hinged end, so as to fold the folding assembly.

In an embodiment, the clamping assembly comprises an extension part, a shaft rod, a clamping part, and a torsion spring;

the extension part is provided at the base plate, and is provided with an arc-shaped slot;

the shaft rod is configured to pass through the extension part;

the clamping part is rotatably provided at the shaft rod;

the torsion spring is sleeved on the shaft rod;

a first end of the torsion spring is configured to abut against the base plate;

a second end of the torsion spring is configured to abut against the clamping part;

the arc-shaped slot is configured to accommodate the push rod head; and the clamping part is configured to limit the push rod head in the arc-shaped slot or release the push rod head from the arc-shaped slot.

In an embodiment, the clamping part is provided a limiting end and a free end;

the limiting end is rotatably provided at the shaft rod;

a bottom of the seat plate is provided with a stop block; and the stop block is configured to abut against the free end to allow the clamping part to rotate in a direction away from the push rod head, thereby releasing the push rod head from the limiting end.

In an embodiment, the plastic electric lift device further comprises a hook assembly;

the hook assembly is provided at the base plate; and the hook assembly is configured to hold the seat plate in a case that the folding assembly is in a folded state, thereby securing the seat plate relative to the base plate.

In an embodiment, the hook assembly comprises a hook and an elastic component;

the hook is rotatably connected to the extension part, and is provided with a hooking end and an adjusting end;

the elastic component is provided at the base plate, and is configured to abut against the adjusting end; and the hooking end is configured to hold the seat plate.

In an embodiment, a bottom of the base plate is provided with a suction cup.

In an embodiment, the base plate is provided with a ramp portion; and the ramp portion is configured to extend in a direction toward a floor.

In an embodiment, at least one of two opposite lateral sides of the base plate is provided with an extending plate.

The benefits of the present application are described as follows.

When it is necessary to help users with limited mobility, such as the elderly individuals or paralyzed patients, stand up, the push rod is driven to retract axially relative to the main body, such that the main body drives the folding assembly to fold, thereby lowering the seat assembly. The seat assembly descends to an appropriate position (for example, the lowest point) to allow the user to sit on the seat plate. Then, the push rod is driven to extend axially relative to the main body, such that the main body drives the folding assembly to expand, thereby raising the seat assembly and the user's gravity center until a standing posture is approached or reached. Additionally, when the plastic electric lift device is not in use or needs to be transferred, the push rod is driven to retract axially relative to the main body, causing the main body to drive the folding assembly to fold, thereby lowering the seat assembly. The limitation of the clamping assembly to the push rod head is then released, and the backrest is rotated towards the seat plate, so as to fold the backrest relative to the seat plate. This allows the plastic electric lift device to be folded (as shown in FIG. 14), significantly reducing the occupied space and facilitating the storage and transport.

BRIEF DESCRIPTION OF THE DRAWINGS

In order to more clearly illustrate the technical solutions in the embodiments of the present disclosure or the prior art, the accompanying drawings needed in the description of the embodiments or the prior art will be briefly described below. Obviously, presented in the accompanying drawings are only some embodiments of the present disclosure. Other embodiments may also be obtained by those skilled in the art according to these accompanying drawings without making creative effort.

Figure 1:
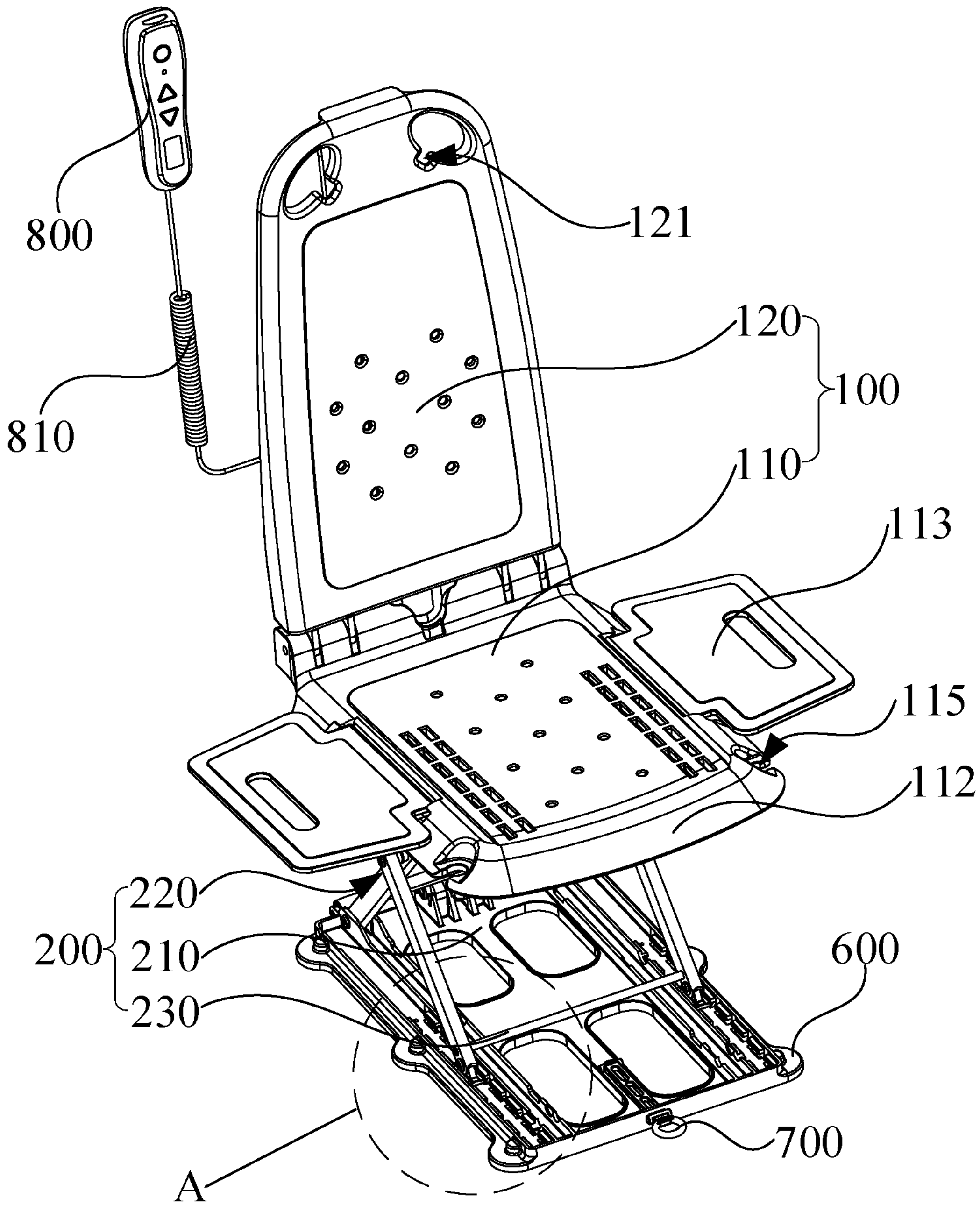
FIG. 1 is a structural diagram of a plastic electric lift device according to an embodiment of the present application.

In the figures, 100—seat assembly; 110—seat plate; 111—second sliding slot; 112—ramp portion; 113—extending plate; 114—snap slot; 115—clamping slot; 116—stop block; 117—hinge hole; 120—backrest; 121—snap hole; 122—hinge part; 130—pin shaft; 140—elastic retaining ring; 200—folding assembly; 210—base plate; 211—first sliding slot; 220—crisscross arm mechanism; 221—first connecting arm; 2211—first hinged end; 2212—first sliding end; 2213—first slider; 222—second connecting arm; 2221—second hinged end; 2222—second sliding end; 2223—second slider; 230—connecting rod; 300—electric push rod assembly; 310—main body; 320—push rod; 321—push rod head; 330—first power cord; 340—first waterproof plug; 400—clamping assembly; 410—extension part; 411—arc-shaped slot; 420—shaft rod; 430—clamping part; 431—limiting end; 432—free end; 440—torsion spring; 500—hook assembly; 510—hook; 511—hooking end; 512—adjusting end; 520—elastic component; 600—suction cup; 610—air exhaust hole; 700—rubber strap; 800—remote control; 810—second power cord; 820—second waterproof plug; and 900—wheel.

Further description of the implementation, function characteristics and advantages of the present disclosure will be presented below with reference to the embodiments and accompanying drawings.

DETAILED DESCRIPTION OF EMBODIMENTS

The clear and comprehensive description of the technical solutions in the embodiments of the present disclosure will be provided below with reference to the accompanying drawings. Obviously, the described embodiments are only some embodiments of the present disclosure, rather than all embodiments. Based on the embodiments of the present disclosure, all other embodiments obtained by those skilled in the art without creative labor shall fall within the scope of the disclosure defined by the appended claims.

It should be noted that all directional indications (such as top, bottom, left, right, front, rear, etc.) in the embodiments of the present disclosure are only used to explain the relative positional relationship or movement between components under a specific configuration (as shown in the drawings). If this specific configuration changes, the directional indications will change accordingly. Furthermore, descriptions involving "first," "second," etc., in the present disclosure, are only used for descriptive purposes, and should not be construed as indicating or implying their relative importance or implicitly specifying the number of the indicated technical features. Therefore, features specified as "first" or "second" may expressly or implicitly include at least one of such feature. Additionally, "and/or" herein includes three solutions, for example, "A and/or B" includes the A technical solution, the B technical solution, and a combination thereof. Furthermore, the technical solutions among various embodiments can be combined with each other as long as the combined solution can be implemented by those skilled in the art. When the combination of technical solutions appears contradictory or cannot be achieved, it should be considered that such a combination does not exist and shall not fall within the scope of the present disclosure.

The specific structure of a plastic electric lift device of the present disclosure will be described as follows.

As shown in FIGS. 1 and 3-6, a plastic electric lift device includes a seat assembly 100, a folding assembly 200, an electric push rod assembly 300 and a clamping assembly 400. The seat assembly 100 includes a seat plate 110 and a backrest 120, the backrest 120 is rotatably connected to the seat plate 110, the folding assembly 200 is configured to support the seat assembly 100, the electric push rod assembly 300 includes a main body 310 and a push rod 320, the push rod 320 is partially provided within the main body 310, the main body 310 is provided at the backrest 120, the push rod 320 is provided with a push rod head 321, the push rod head 321 is removably provided at the folding assembly 200, the push rod 320 is configured to extend and retract along an axial direction of the main body 310, such that the main body drives the folding assembly 200 to become unfolded or folded, so as to drive the seat assembly 100 to ascend and descend, the clamping assembly 400 is configured to limit the push rod head 321 to the folding assembly 200 or to release the push rod head 321 from the folding assembly 200, so as to achieve a removable arrangement of the push rod head 321 relative to the folding assembly 200.

Figure 14:
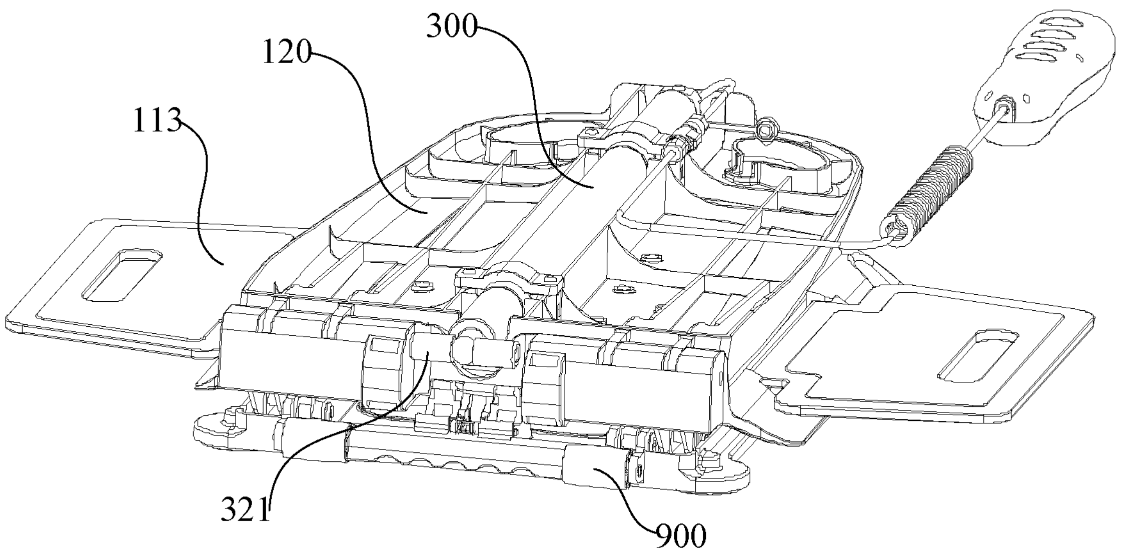
FIG. 14 is a structural diagram of the plastic electric lift device according to an embodiment of the present application in a folded state.
Figure 15:
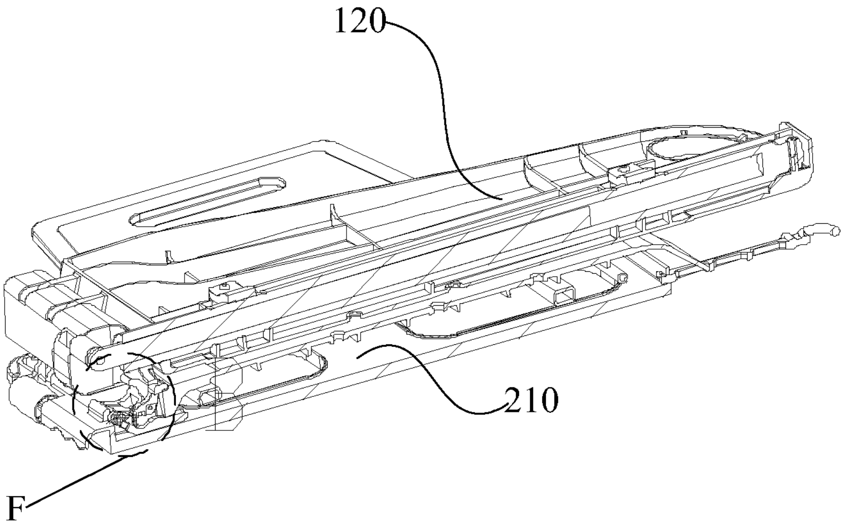
FIG. 15 is an axonometric sectional view of the plastic electric lift device in FIG. 14.
Figure 16:
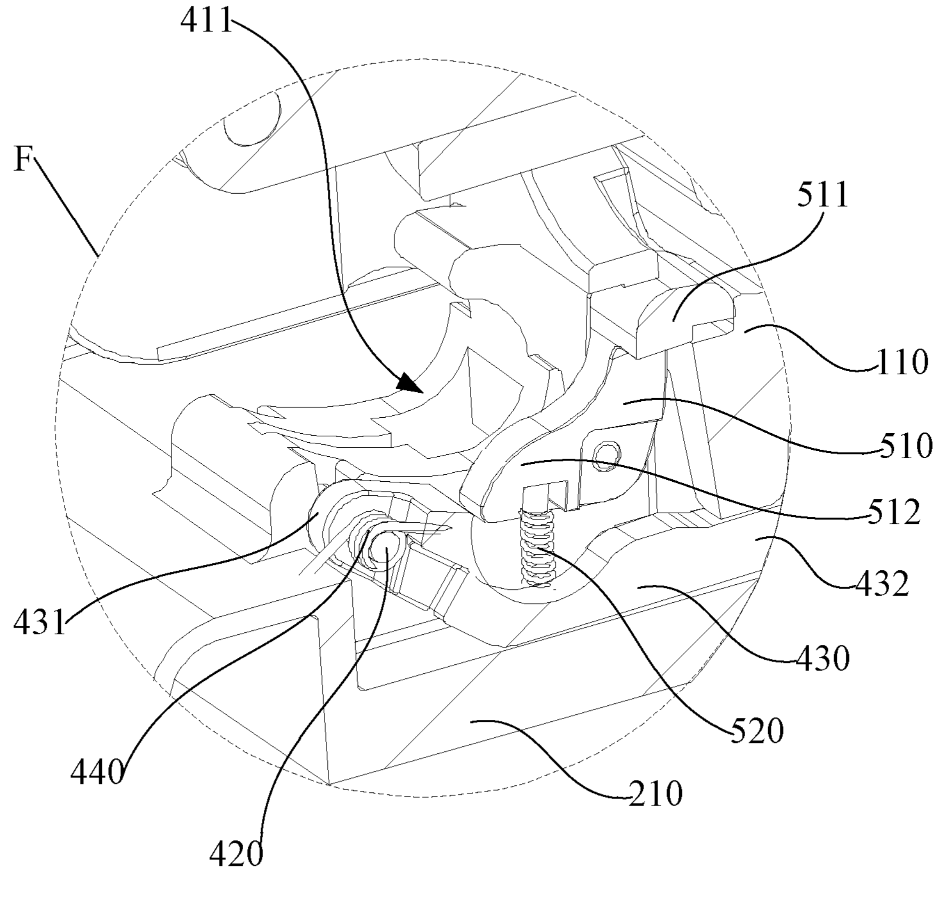
FIG. 16 is an enlarged view of part "F" in FIG. 15.

When it is necessary to help users with limited mobility, such as the elderly individuals or paralyzed patients stand up, the push rod 320 is driven to retract axially relative to the main body 310, such that the main body 310 drives the folding assembly 200 to fold, thereby lowering the seat assembly 100. The seat assembly 200 descends to an appropriate position (for example, the lowest point) to allow the user to sit on the seat plate 110. Then, the push rod 320 is driven to extend axially relative to the main body 310, such that the main body 310 drives the folding assembly 200 to expand, thereby raising the seat assembly and the user's gravity center until a standing posture is approached or reached. Additionally, when the plastic electric lift device is not in use or needs to be transferred, the push rod 320 is driven to retract axially relative to the main body 310, such that the main body 310 drives the folding assembly 200 to fold, thereby lowering the seat assembly 100. The limitation of the clamping assembly 400 to the push rod head 321 is then released, and the backrest 120 is rotated towards the seat plate 110, so as to fold the backrest 120 relative to the seat plate 110. This allows the plastic electric lift device to be folded (as shown in FIG. 14), significantly reducing the occupied space and facilitating the storage and transport.

Specifically, if the clamping assembly 400 does not release the limitation to the push rod head 321, the push rod head 321 cannot rotate relative to the folding assembly 200. In this case, the backrest 120, limited by the electric push rod assembly 300, cannot rotate relative to the seat plate 110, thus making it impossible to fold the backrest 120 relative to the seat plate 110.

In this embodiment, the clamping assembly 400 is arranged at the folding assembly 200.

Specifically, the electric push rod assembly 300 has a pen-shaped structure. The electric push rod assembly 300 adopts a 24V safety voltage, the thrust of the electric push rod assembly 300 is 2000N, the lifting stroke of the electric push rod assembly 300 is 400 mm, and the load of the electric push rod assembly 300 is 330 pounds (LB).

In this embodiment, the seat assembly 100 and the folding assembly 200 are made of plastic with the advantages of being lightweight and low-cost.

Referring to FIGS. 18 to 21, the seat assembly 100 further includes a pin shaft 130. The backrest 120 is rotatably connected to the seat plate 110 via the pin shaft 130. Specifically, the pin shaft 130 passes through the backrest 120 and the seat plate 110, allowing the backrest 120 to rotate relative to the seat plate 110 around the pin shaft 130.

Referring to FIGS. 18 to 21, the backrest 120 has a hinge part 122, and the seat plate 110 has a hinge hole 117. The hinge part 122 is accommodated within the hinge hole 117, and the pin shaft 130 passes through the hinge part 122 and the hinge hole 117, thereby achieving a rotational connection between the backrest 120 and the seat plate 110. In this embodiment, the hinge part 122 is located at the lower end of the backrest 120 (the lower end of the backrest 120 refers to the end of the backrest 120 near to the seat plate 110), and the hinge hole 117 is located on the rear side of the seat plate 110 (the rear side of the seat plate 110 refers to the end of the seat plate 110 near to the backrest 120).

Referring to FIGS. 18 to 21, there are multiple hinge parts 122, and the number of hinge holes 117 is the same as the number of hinge parts 122, with each hinge hole 117 corresponding to a hinge part 122. The pin shaft 130 passes through multiple hinge parts 122 and multiple hinge holes 117, making the rotational connection between the backrest 120 and the seat plate 110 more reliable.

Referring to FIGS. 18 to 21, in this embodiment, there are two pin shafts 130, four hinge parts 122 and four hinge holes 117. Each hinge part 122 is accommodated within a corresponding hinge hole 117, and each pin shaft 130 passes through two hinge parts 122 and two hinge holes 117, thereby achieving a rotational connection between the backrest 120 and the seat plate 110.

Specifically, referring to FIGS. 18 to 21, two hinge parts 122 are located on the left side of the lower end of the backrest 120, and two other hinge parts 122 are located on the right side of the lower end of the backrest 120. Two hinge holes 117 are located on the left part of the rear side of the seat plate 110, and the other two hinge holes 117 are located on the right part of the rear side of the seat plate 110. The two hinge parts 122 on the left side of the lower end of the backrest 120 are accommodated within the two hinge holes 117 on the left part of the rear side of the seat plate 110, and the two hinge parts 122 on the right side of the lower end of the backrest 120 are accommodated within the two hinge holes 117 on the right part of the rear side of the seat plate 110. One pin shaft 130 passes through the two hinge parts 122 on the left side of the lower end of the backrest 120 and the two hinge holes 117 on the left part of the rear side of the seat plate 110. The other pin shaft 130 passes through the two hinge parts 122 on the right side of the lower end of the backrest 120 and the two hinge holes 117 on the right part of the rear side of the seat plate 110. This configuration ensures that both the left and right sides of the backrest 120 are rotatably connected to the seat plate 110. The backrest 120 can rotate relative to the seat plate 110 around the two pin shafts 130. With four hinge parts 122 and four hinge holes 117, there are four connection points between the backrest 120 and the seat plate 110, providing more reliable connection strength.

Figure 20:
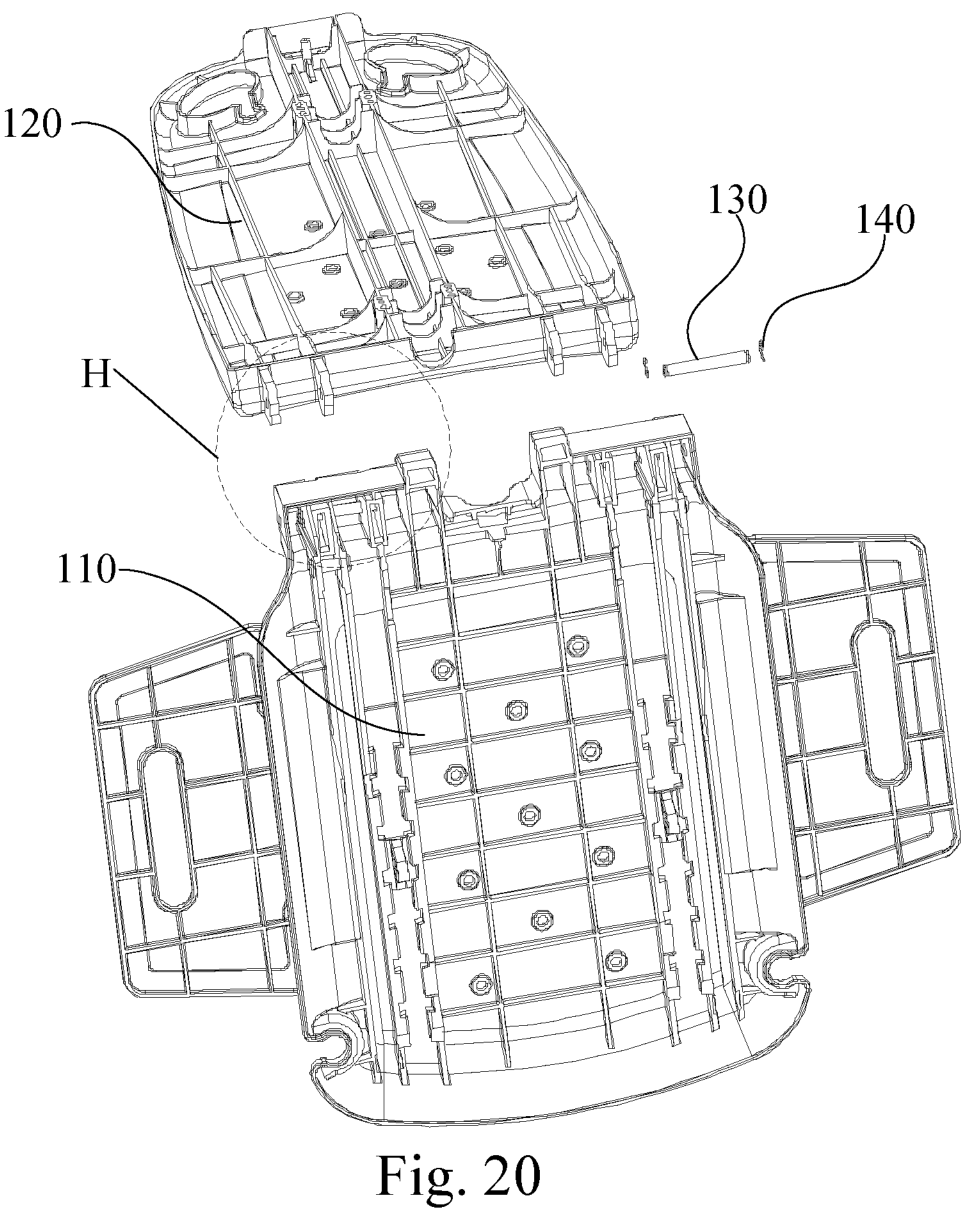
FIG. 20 is another exploded view of the seat assembly from another perspective according to an embodiment of the present application.
Figure 21:
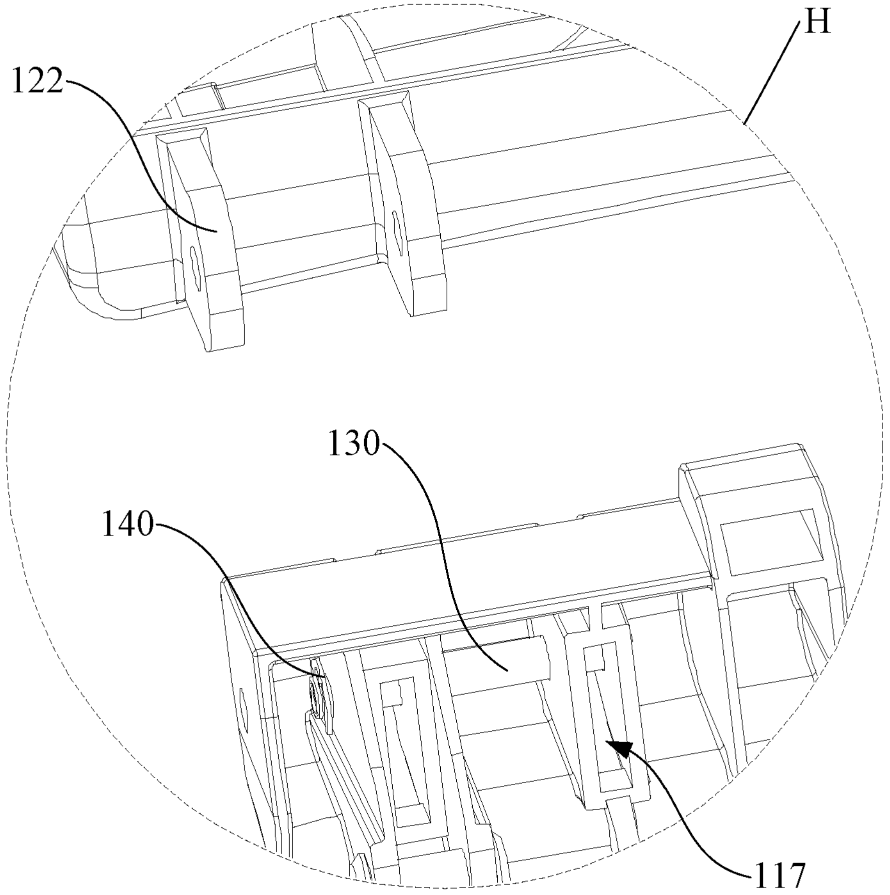
FIG. 21 is an enlarged view of part "H" in FIG. 20.

Referring to FIGS. 20 and 21, the seat assembly 100 also includes elastic retaining rings 140. Both ends of each of the pin shaft 130 are equipped with elastic retaining rings 140 to secure the pin shafts 130 on the seat plate 110. In this embodiment, there are four elastic retaining rings 140, with both ends of the two pin shafts 130 equipped with elastic retaining rings 140.

Referring to FIG. 1, the folding assembly 200 includes a base plate 210 and crisscross arm mechanisms 220 arranged on the base plate 210. The crisscross arm mechanisms 220 are used to support the seat plate 110 of the seat assembly 100. Specifically, the raising and lowering of the seat assembly 100 are achieved through the expanding and folding of the crisscross arm mechanisms 220. In this embodiment, the clamping assembly 400 is arranged on the base plate 210.

Figure 8:
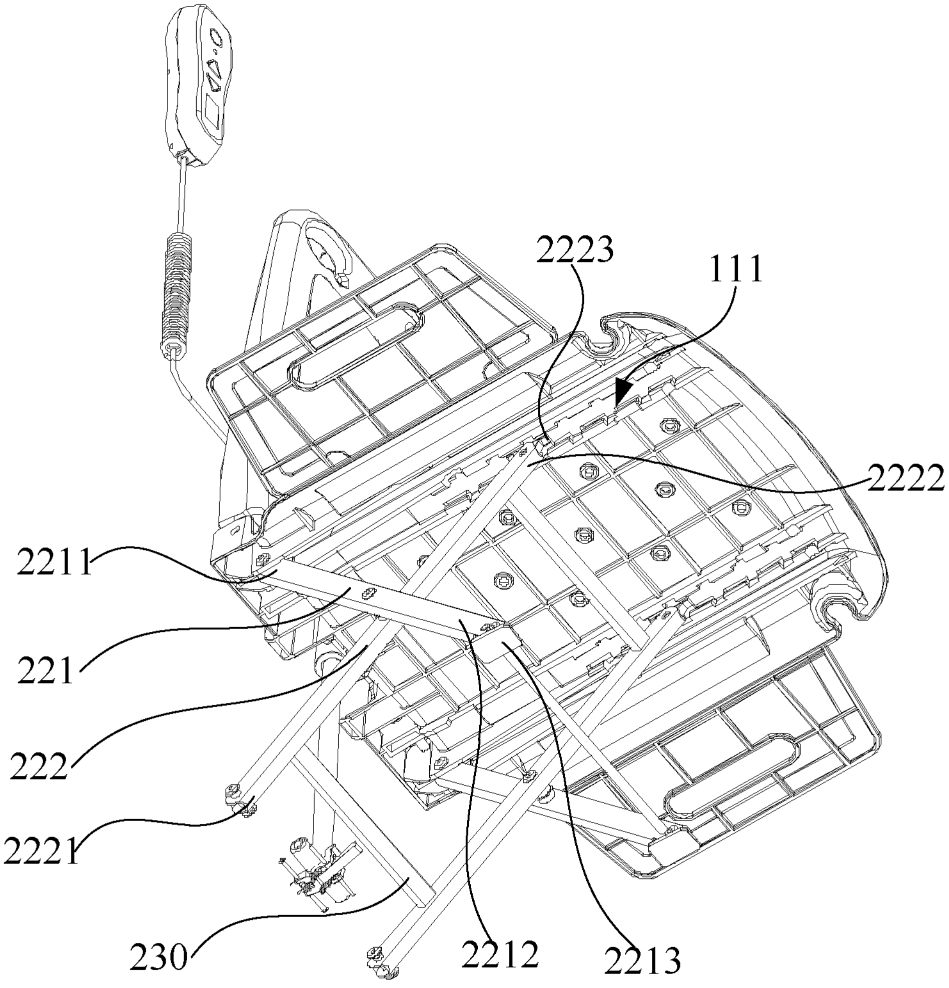
FIG. 8 is a structural diagram of the plastic electric lift device (without the base plate) according to an embodiment of the present application viewed from the bottom.
Figure 9:
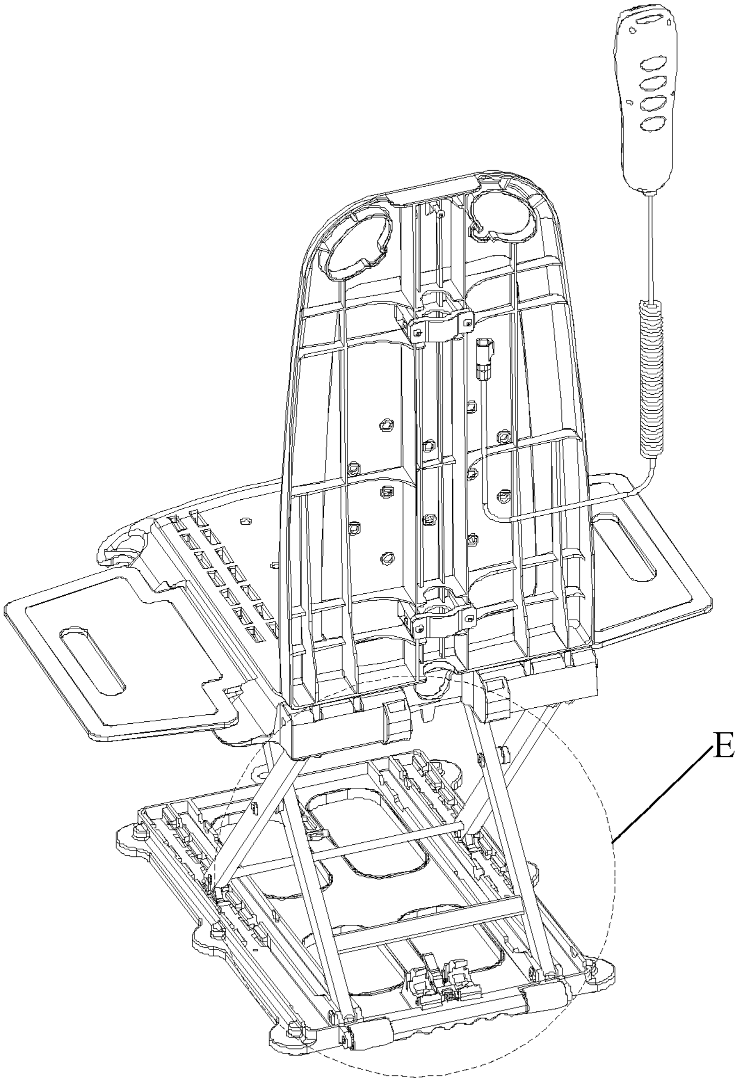
FIG. 9 is a structural diagram of the plastic electric lift device (without the electric push rod assembly) according to an embodiment of the present application viewed from the bottom.
Figure 10:
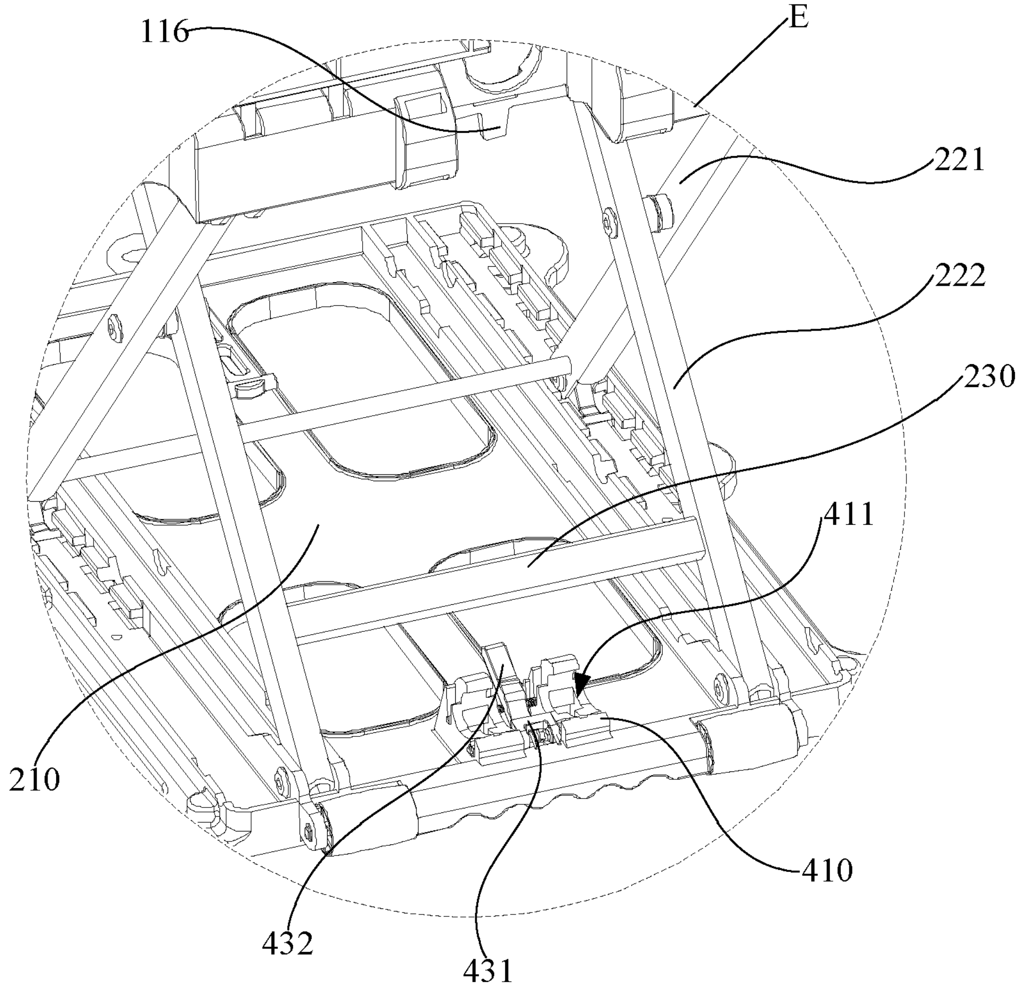
FIG. 10 is an enlarged view of part "E" in FIG. 9.

Referring to FIGS. 1 and 8, each of the crisscross arm mechanisms 220 includes a first connecting arm 221 and a second connecting arm 222 hinged to each other. The first connecting arm 221 has a first hinged end 2211 and a first sliding end 2212, with the first hinged end 2211 hinged to the seat plate 110 and the first sliding end 2212 slidably arranged on the bottom of the base plate 210. The second connecting arm 222 has a second hinged end 2221 and a second sliding end 2222, with the second hinged end 2221 hinged to the base plate 210 and the second sliding end 2222 slidably arranged on the bottom of the seat plate 110. The push rod 320 can extend axially relative to the main body 310 to drive the first sliding end 2212 to move away from the second hinged end 2221 and drive the second sliding end 2222 to move away from the first hinged end 2211 so as to unfold the folding assembly, and the push rod 320 can retract axially relative to the main body 310 to drive the first sliding end 2212 to move close to the second hinged end 2221 and drive the second sliding end 2222 to move close to the first hinged end 2211 so as to fold the folding assembly 200. In this embodiment, the middle portion of the first connecting arm 221 is hinged to the middle portion of the second connecting arm 222.

Figure 2:
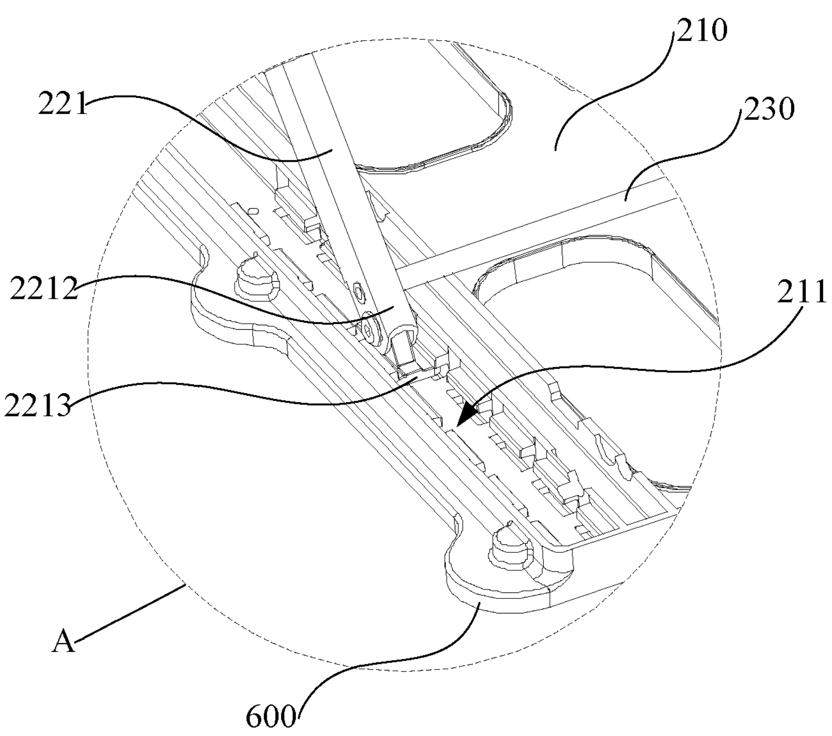
FIG. 2 is an enlarged view of part "A" in FIG. 1.

Referring to FIGS. 1, 2, and 8, the first sliding end 2212 is connected to a first slider 2213, and the second sliding end 2222 is connected to a second slider 2223. The top of the base plate 210 has a first sliding slot 211, and the bottom of the seat plate 110 has a second sliding slot 111. The first slider 2213 is slidably engaged in the first sliding slot 211 and can slide along the first sliding slot 211 to move away from or close to the second hinged end 2221. The second slider 2223 is slidably engaged in the second sliding slot 111 and can slide along the second sliding slot 111 to move away from or close to the first hinged end 2211.

Specifically, when the push rod 320 extends axially relative to the main body 310, the first slider 2213 drives the first sliding end 2212 along the first sliding slot 211 away from the second hinged end 2221, and the second slider 2223 drives the second sliding end 2222 along the second sliding slot 111 away from the first hinged end 2211, thereby achieving the unfolding of the folding assembly 200. When the push rod 320 retracts axially relative to the main body 310, the first slider 2213 drives the first sliding end 2212 along the first sliding slot 211 close to the second hinged end 2221, and the second slider 2223 drives the second sliding end 2222 along the second sliding slot 111 close to the first hinged end 2211, thereby achieving the folding of the folding assembly 200.

Referring to FIGS. 1 and 8, there are two crisscross arm mechanisms 220, which are spacedly provided between the base plate 210 and the seat plate 110. Specifically, the support for the seat assembly 100 is more reliable, due to the two crisscross arm mechanisms 220. Additionally, there are also two first sliding slots 211 and two second sliding slots 111, corresponding to the two crisscross arm mechanisms 220.

Referring to FIGS. 2 and 8, the folding assembly 200 also includes a connecting rod 230. The connecting rod 230 is positioned between the two first connecting arms 221 and between the two second connecting arms 222.

Referring to FIGS. 4 to 6, 10 and 16, the clamping assembly 400 includes an extension part 410, a shaft rod 420, a clamping part 430, and a torsion spring 440, the extension part 410 is arranged on the base plate 210 and has an arc-shaped slot 411, the shaft rod 420 passes through the extension part 410, the clamping part 430 is rotatably arranged on the shaft rod 420, the torsion spring 440 is sleeved on the shaft rod 420, one end of the torsion spring 440 abuts against the base plate 210 and the other end abuts against the clamping part 430, the arc-shaped slot 411 is used to accommodate the push rod head 321, and the clamping part 430 is used to limit the push rod head 321 in the arc-shaped slot 411 or to release the push rod head 321 from the arc-shaped slot 411.

Figure 6:
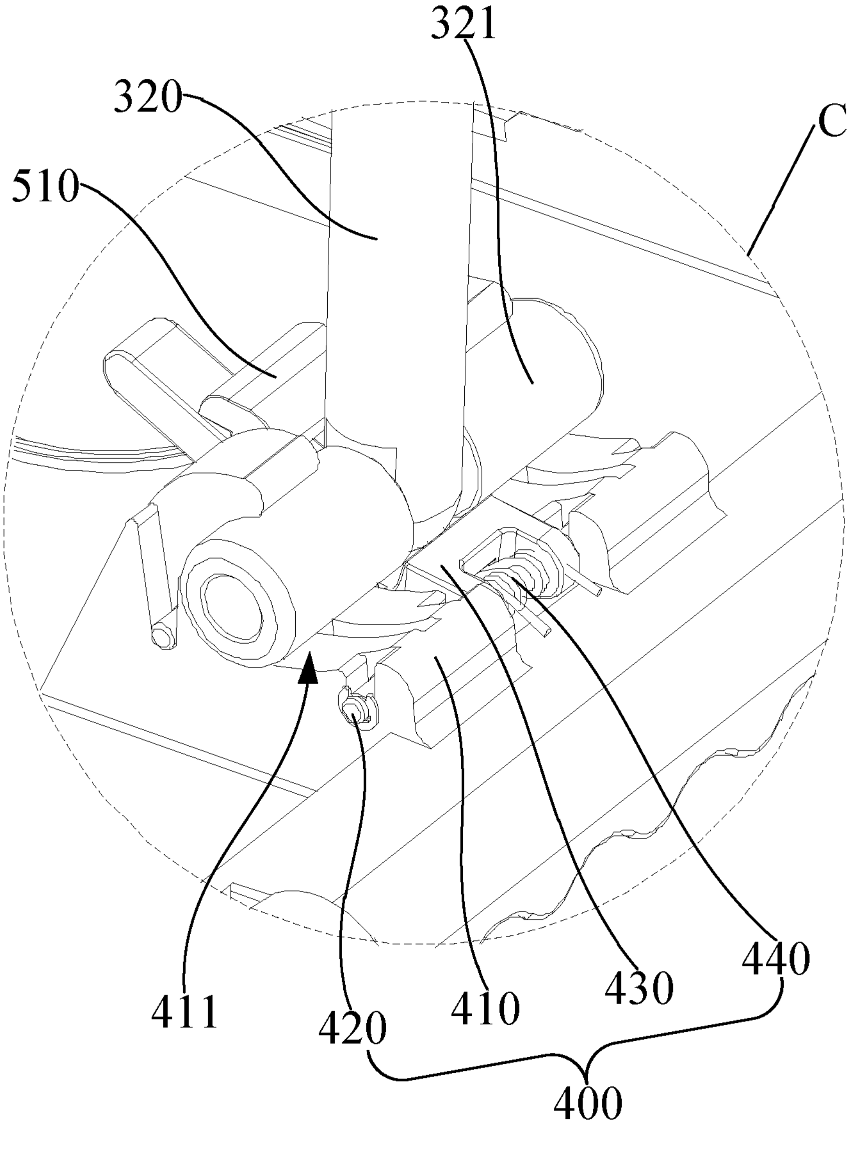
FIG. 6 is an enlarged view of part "C" in FIG. 5.

Referring to FIGS. 6 and 14, the push rod head 321 is cylindrical and is arranged at the end of the push rod 320. In this embodiment, there are two push rod heads 321, positioned on both sides of the end of the push rod 320.

Referring to FIGS. 4, and 9 to 16, the clamping part 430 is provided with a limiting end 431 and a free end 432, the limiting end 431 is rotatably arranged on the shaft rod 420, a stop block 116 is arranged at the bottom of the seat plate 110, and the stop block 116 is used to abut against the free end 432 to allow the clamping part 430 to rotate away from the push rod head 321, thereby allowing the limiting end 431 to release the push rod head 321.

Specifically, when the folding assembly 200 is unfolded, the seat plate 110 moves away from the base plate 210, causing the stop block 116 to move away from the free end 432. This allows the clamping part 430 to return to its original state under the action of the torsion spring 440, rotating towards the push rod head 321, such that the limiting end 431 of the clamping part 430 limits the push rod head 321. When the folding assembly 200 is folded, the seat plate 110 moves close to the base plate 210, causing the stop block 116 to approach and abut against the free end 432, thereby rotating the clamping part 430 away from the push rod head 321, causing the limiting end 431 to release the push rod head 321. Once the limiting end 431 releases the push rod head 321, the backrest 120 can be rotated, causing the electric push rod assembly 300 to rotate together with the backrest 120 relative to the seat plate 110, thereby achieving the folding of the backrest 120.

In other words, when the folding assembly 200 is folded, causing the seat plate 110 to descend to its lowest point, the limiting end 431 of the clamping part 430 releases the push rod head 321. Conversely, when the folding assembly 200 is unfolded, causing the seat plate 110 to ascend, the clamping part 430 resets under the action of the torsion spring 440, and the limiting end 431 of the clamping part 430 limits the push rod head 321.

Figure 4:
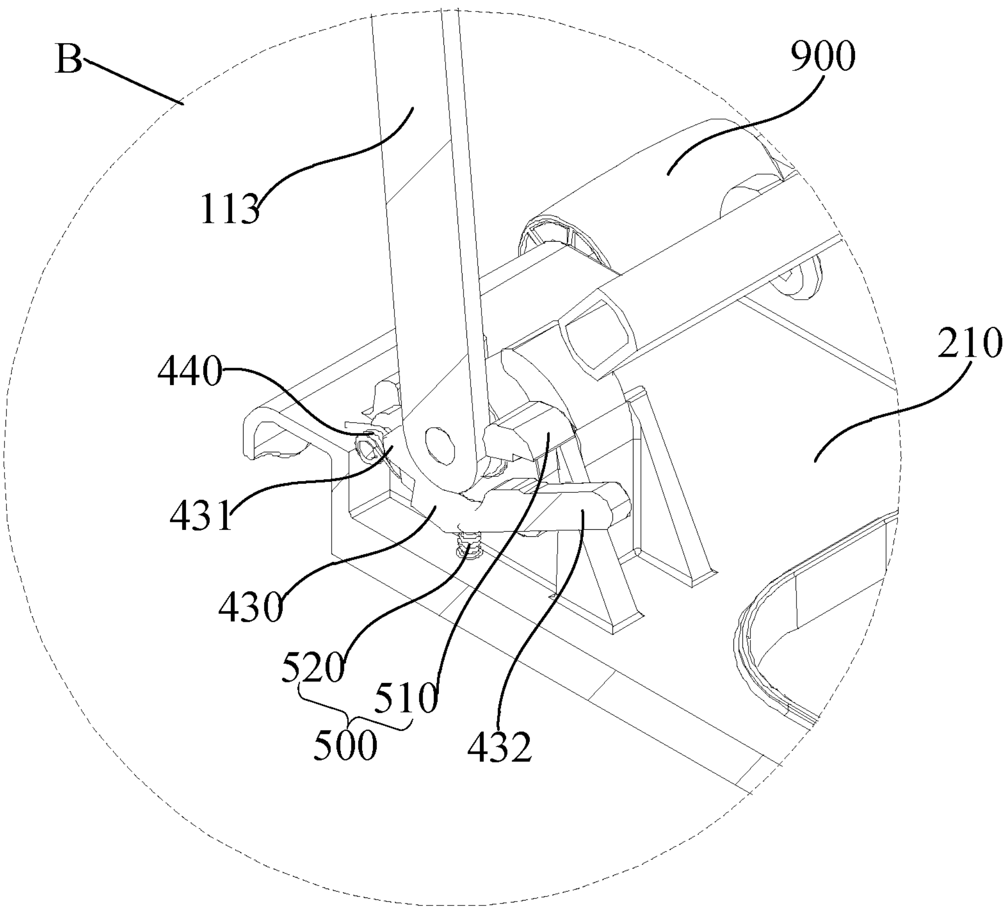
FIG. 4 is an enlarged view of part "B" in FIG. 3.

Referring to FIG. 4, the plastic electric lift device also includes a hook assembly 500, which is arranged on the base plate 210. The hook assembly 500 is used to hold the seat plate 110 when the folding assembly 200 is folded, thereby fixing the seat plate 110 relative to the base plate 210.

Referring to FIGS. 4, 11 to 16, the hook assembly 500 includes a hook 510 and an elastic component 520. The hook 510 is rotatably connected to the extension part 410. The hook 510 has a hooking end 511 and an adjusting end 512. The elastic component 520 is arranged on the base plate 210 and abuts against the adjusting end 512. The hooking end 511 is used to hold the seat plate 110.

Specifically, when the push rod head 321 is limited in the arc-shaped slot 411, the push rod 320 abuts against the adjusting end 512, causing the hooking end 511 to tilt upward, thereby releasing the hooking end 511 from holding the seat plate 110. When the push rod head 321 leaves the arc-shaped slot 411, the push rod 320 does not abut against the adjusting end 512, and the adjusting end 512 tilts upward under the action of the elastic component 520, causing the hooking end 511 to press down, thereby allowing the hooking end 511 to hold the seat plate 110.

In this embodiment, the elastic component 520 is a spring. There are two elastic components 520, both abutting against the adjusting end 512, providing a more reliable elastic force to the adjusting end 512 of the hook 510.

In this embodiment, due to the configuration of the hook assembly 500, when the push rod head 321 is limited by the limiting end 431 of the clamping part 430 and the end of the push rod 320 abuts against the adjusting end 512 of the hook assembly 500, the hooking end 511 does not hold the seat plate 110. When the push rod head 321 leaves the arc-shaped slot 411 and the end of the push rod 320 no longer abuts against the adjusting end 512 of the hook assembly 500, the hooking end 511 holds the seat plate 110. In other words, when the plastic electric lift device is fully folded, the push rod head 321 has already left the arc-shaped slot 411, ensuring that the hooking end 511 holds the seat plate 110, thereby fixing the seat plate 110 relative to the base plate 210. When the electric push rod assembly 300 extends or retracts, the push rod head 321 inside the arc-shaped slot 411 abuts against the adjusting end 512 of the hook assembly 500, ensuring that the hooking end 511 does not hold the seat plate 110, thus allowing the seat plate 110 to move up and down relative to the base plate 210. Additionally, when the backrest 120 switches from the folded to the unfolded state, since the seat plate 110 is fixed relative to the base plate 210 during the folded state of the backrest 120, the arc-shaped slot 411 on the base plate 210 remains in the same position relative to the backrest 120 and the electric push rod assembly 300. This ensures that when the backrest 120 is unfolded, the push rod head 321 of the electric push rod assembly 300 can be exactly accommodated within the arc-shaped slot 411.

Figure 11:
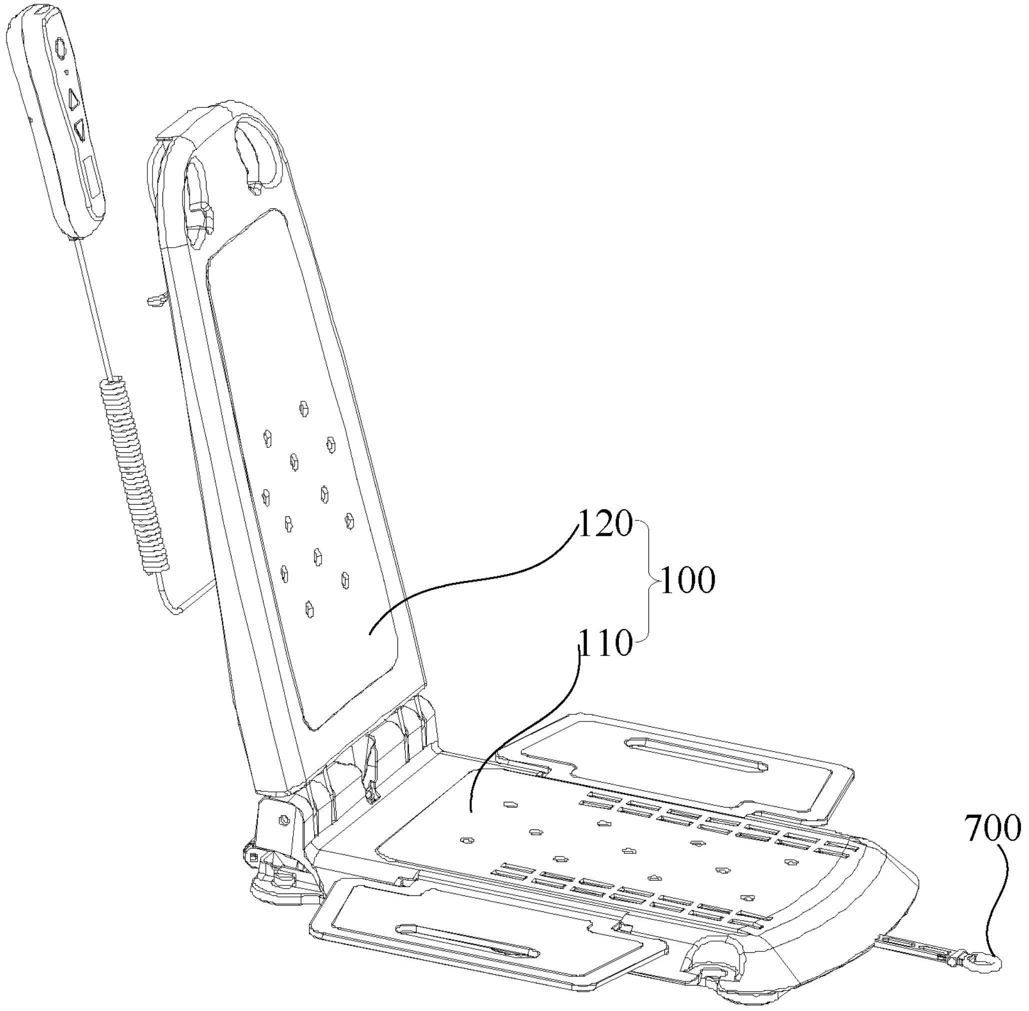
FIG. 11 is a structural schematic diagram of the plastic electric lift device according to an embodiment of the present application with the folding assembly being folded.
Figure 12:
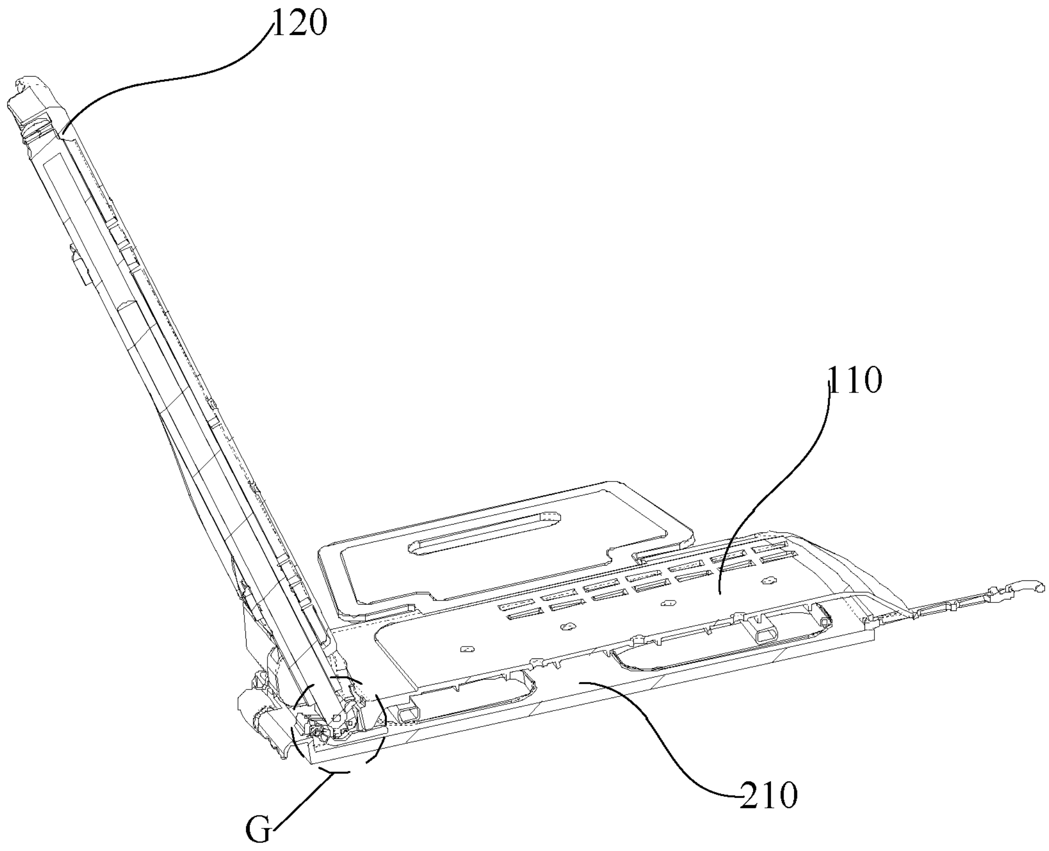
FIG. 12 is an axonometric sectional view of the plastic electric lift device in FIG. 11.
Figure 13:
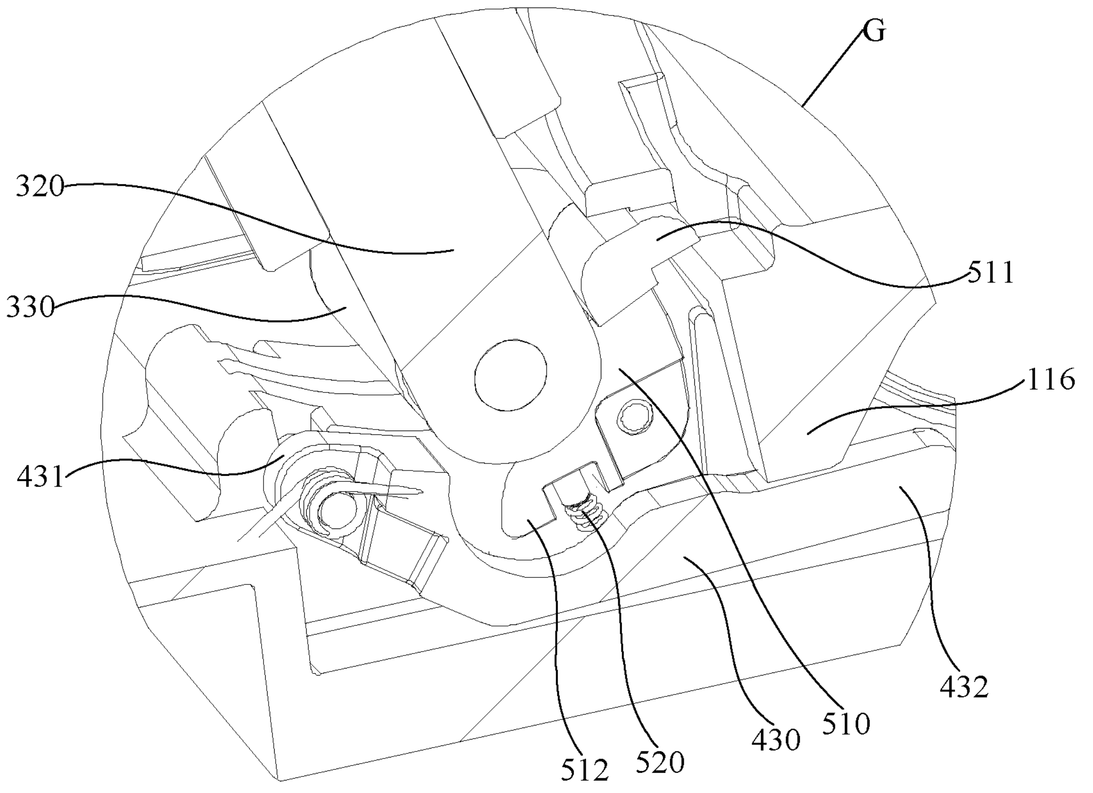
FIG. 13 is an enlarged view of part "G" in FIG. 12.

Specifically, when the folding assembly 200 is folded and the hooking end 511 of the hook assembly 500 holds the seat plate 110, the seat plate 110 is fixed relative to the base plate 210, as shown in FIG. 11. Furthermore, when the folding assembly 200 is folded, the seat plate 110 is fixed relative to the base plate 210, and the backrest 120 is folded relative to the seat plate 110, the entire plastic electric lift device is folded, as shown in FIG. 14.

Referring to FIG. 1, suction cups 600 are provided on the bottom of the base plate 210. The suction cups 600 are designed separately to provide suction and anti-slip functions. Specifically, the plastic electric lift device herein can be used in a bathtub, with the suction cups 600 adhering to the bottom of the bathtub to ensure the stability of the plastic electric lift device, preventing the user sitting on the seat plate 110 from falling.

Referring to FIG. 1, there are multiple suction cups 600, which are spacedly provided on the bottom of the base plate 210.

Figure 17:
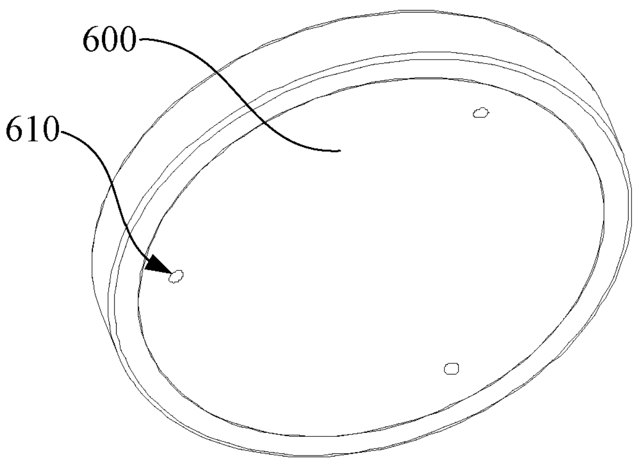
FIG. 17 is a structural diagram of a suction cup according to an embodiment of the present application.
Figure 18:
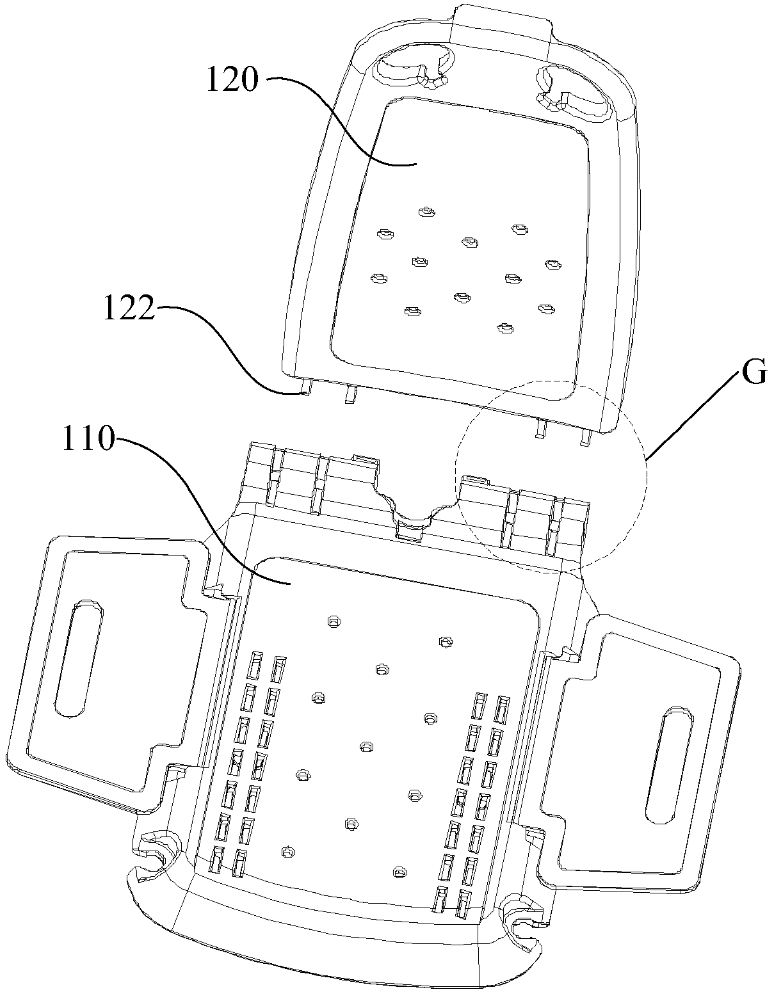
FIG. 18 is an exploded view of a seat assembly according to an embodiment of the present application.
Figure 19:
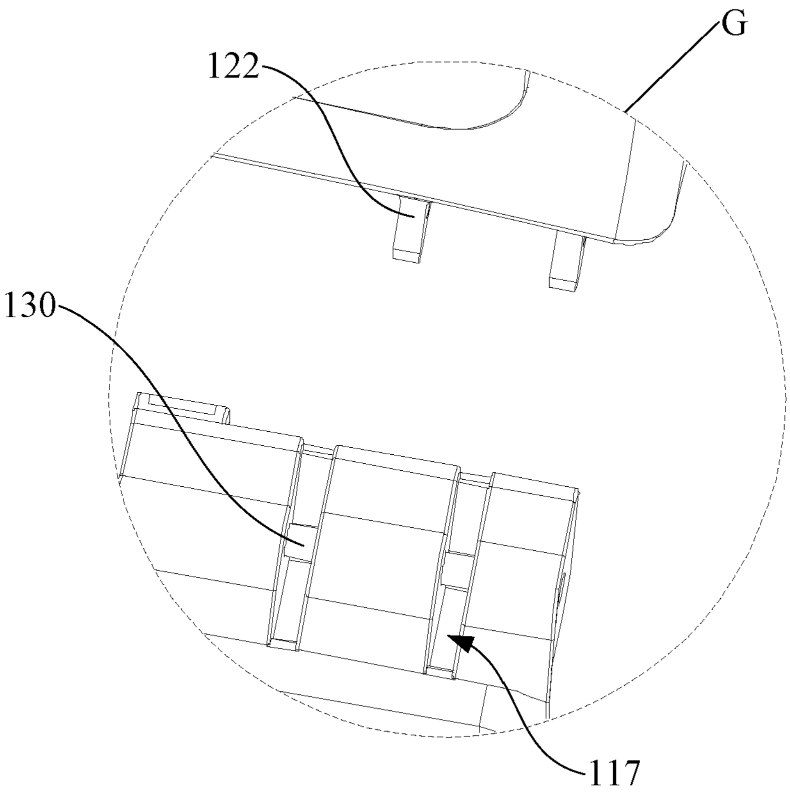
FIG. 19 is an enlarged view of part "G" in FIG. 18.

Referring to FIG. 17, the suction cup 600 is provided with air exhaust holes 610. The air exhaust holes 610 are in contact with the bottom of the bathtub when the user sits on the seat plate 110, thereby being covered by the bottom of the bathtub. At this time, the suction cup 600 can reliably adhere to the bottom of the bathtub. When the user gets up from the seat plate 110, the air exhaust holes 610 separate from the bottom of the bathtub, and external air is communicated with the suction cup through the air exhaust holes 610. As a result, the suction cup 600 loses its suction, making it easy to remove the plastic electric lift device.

Specifically, each suction cup 600 has multiple air exhaust holes 610.

Referring to FIG. 1, the plastic electric lift device also includes a rubber strap 700. The rubber strap 700 is provided at the base plate 210 and is used to be snapped with backrest 120 to secure the backrest 120 relative to the base plate 210 when the plastic electric lift device is folded. Specifically, the rubber strap 700 can automatically retract back into the base plate 210. When the rubber strap 700 is needed, it can be manually pulled out and secured to the backrest 120.

Referring to FIG. 1, the backrest 120 has snap holes 121, and the rubber strap 700 is used to be snapped with the snap holes 121. In this embodiment, the snap holes 121 are located at the upper part of the backrest 120. There are two snap holes 121, allowing the rubber strap 700 to be snapped with either of them as needed. In other embodiments, the number of snap holes 121 can be three or more.

Referring to FIG. 1, the seat plate 110 has a downward-sloping ramp portion 112, forming a ramp. When the seat plate 110 is in a lower position, it is easier for the user (or person) to move from the floor onto the seat plate 110.

Specifically, the ground clearance of the seat plate 110 at its lowest position is 60 mm. With the downward-sloping ramp portion 112, the user (or person) can easily slide onto the seat plate 110.

Referring to FIG. 1, the ramp portion 112 is located on at least one of the front, left, and right sides of the seat plate 110. In this embodiment, the front, left, and right sides of the seat plate 110 all have downward-sloping ramp portions 112, forming a three-sided ramp. Specifically, the ramp has a certain guiding effect, making it easy for the user to slide onto the seat plate 110. The ramp also acts like a chamfer, preventing the user from being scratched by the front, left or right sides of the seat plate 110 when moving from the front, left or right sides of the seat plate 110 onto the seat plate 110.

Referring to FIG. 1, at least one of the left and right sides of the seat plate 110 is equipped with extending plates 113. In this embodiment, both the left and right sides of the seat plate 110 are equipped with extending plates 113, which are sloped downwards. Specifically, the extending plates 113 facilitate the movement of individuals onto the seat plate 110. Additionally, when the plastic electric lift device is used in a bathtub, the extending plates 113 can rest on the edge of the bathtub, making it easier for the user to move onto the seat plate 110.

Figure 3:
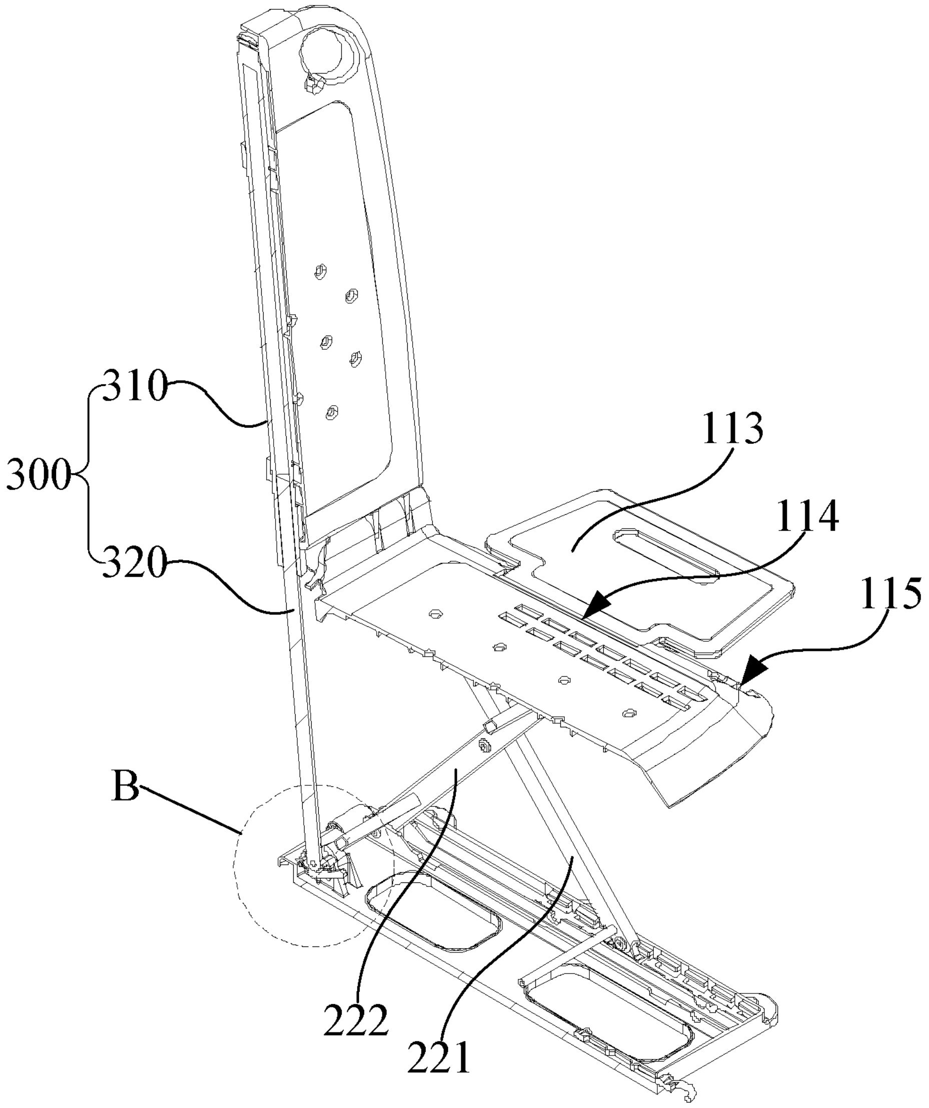
FIG. 3 is an axonometric sectional view of the plastic electric lift device in FIG. 1.

Referring to FIG. 3, at least one of the left and right sides of the seat plate 110 has snap slots 114, and the extending plates 113 can be removably set in the snap slots 114. In this embodiment, both the left and right sides of the seat plate 110 have snap slots 114, corresponding to the two extending plates 113.

Referring to FIG. 1, at least one of the left and right sides of the seat plate 110 has clamping slots 115, which are used to hold external mechanisms. In this embodiment, both the left and right sides of the seat plate 110 have clamping slots 115, which can hold items such as shower heads.

Referring to FIG. 1, the plastic electric lift device also includes a remote control 800, which is electrically connected to the electric push rod assembly 300. The remote control 800 is used to control the start, stop, and extension/retraction of the electric push rod assembly 300.

Furthermore, the remote control 800 is equipped with a lithium battery, which is a rechargeable lithium battery.

Figure 5:
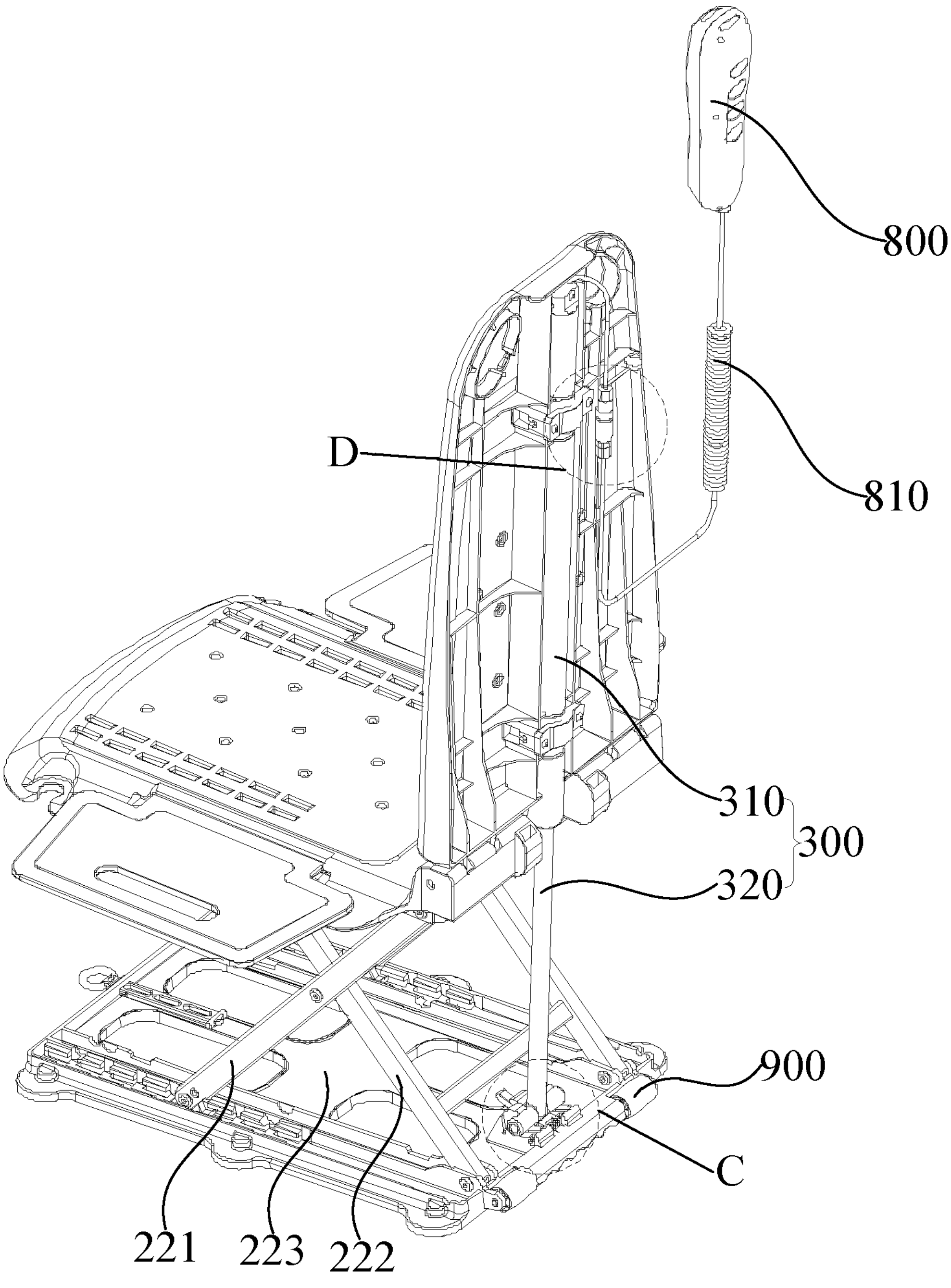
FIG. 5 is a structural diagram of the plastic electric lift device according to an embodiment of the present application from another perspective.
Figure 7:
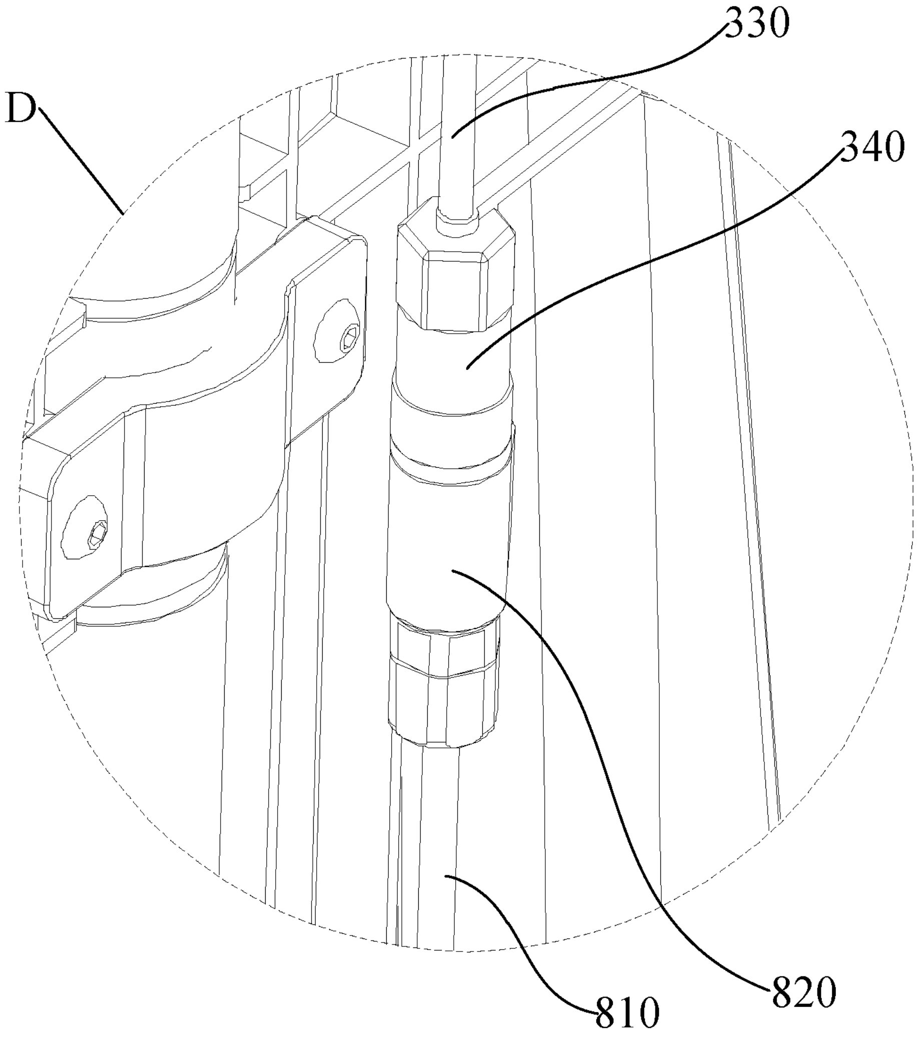
FIG. 7 is an enlarged view of part "D" in FIG. 5.

Referring to FIGS. 5 and 7, the electric push rod assembly 300 has a first power cord 330, and the remote control 800 has a second power cord 810. The second power cord 810 is used to electrically connect with the first power cord 330, thereby achieving the electrical connection between the remote control 800 and the electric push rod assembly 300.

Referring to FIG. 7, the first power cord 330 is connected to a first waterproof plug 340, and the second power cord 810 is connected to a second waterproof plug 820. The first waterproof plug 340 is removably connected to the second waterproof plug 820, thereby achieving the electrical connection between the second power cord 810 and the first power cord 330. Specifically, when the remote control 800 needs to be charged, the first waterproof plug 340 and the second waterproof plug 820 are separated, and then the second waterproof plug 820 of the remote control 800 is plugged into an external power source.

Referring to FIG. 5, the base plate 210 is rotatably equipped with a wheel 900, making it convenient to move the plastic electric lift device.

Furthermore, the wheel 900 is rotatably positioned on the rear side wall of the base plate 210. This allows the plastic electric lift device to be moved by pulling the rubber strap 700, the backrest 120, or the snap hole 121 on the backrest 120, with the wheel 900 contacting and rolling on the ground after the device is folded.

Additionally, when the folding assembly 200 is expanded, the electric push rod assembly 300 remains vertical. Under the influence of the electric push rod assembly 300, the backrest 120 also stays vertical. However, when the folding assembly 200 is folded and the push rod head 321 is not limited, the electric push rod assembly 300 can rotate along with the backrest 120. This allows the user, when seated on the seat plate 110, to lean against the backrest 120, causing the backrest 120 and the electric push rod assembly 300 to tilt backward together (refer to FIG. 11), thereby providing a more comfortable sitting experience.

Described above are merely preferred embodiments of this application, and are not intended to limit this application. It should be understood that various variations, modifications and replacements made by those skilled in the art without departing from the spirit of the present disclosure shall fall within the scope of the disclosure defined by the appended claims.

What is claimed is:

1. A plastic electric lift device, comprising:

a seat assembly;

a folding assembly;

an electric push rod assembly; and a clamping assembly;

wherein the seat assembly comprises a seat plate and a backrest; the backrest is rotatably connected to the seat plate;

the folding assembly is configured to support the seat assembly;

the electric push rod assembly comprises a main body and a push rod; the push rod is partially provided within the main body; the main body is provided at the backrest; the push rod is provided with a push rod head; the push rod head is removably provided at the folding assembly; the push rod is configured to extend and retract along an axial direction of the main body, such that the main body drives the folding assembly to become unfolded or folded, so as to drive the seat assembly to ascend or descend; and the clamping assembly is configured to limit the push rod head to the folding assembly or to release the push rod head from the folding assembly, so as to achieve a removable arrangement of the push rod head relative to the folding assembly;

the folding assembly comprises a base plate and a crisscross arm mechanism;

the crisscross arm mechanism is provided at the base plate;

the crisscross arm mechanism is configured to support the seat plate;

the clamping assembly comprises an extension part, a shaft rod, a clamping part, and a torsion spring;

the extension part is provided at the base plate, and is provided with an arc-shaped slot:

the shaft rod is configured to pass through the extension part;

the clamping part is rotatably provided at the shaft rod;

the torsion spring is sleeved on the shaft rod;

a first end of the torsion spring is configured to abut against the base plate;

a second end of the torsion spring is configured to abut against the clamping part;

the arc-shaped slot is configured to accommodate the push rod head; and the clamping part is configured to limit the push rod head in the arc-shaped slot or release the push rod head from the arc-shaped slot.

2. The plastic electric lift device of claim 1, wherein the crisscross arm mechanism comprises a first connecting arm and a second connecting arm hinged to each other;

the first connecting arm is provided with a first hinged end and a first sliding end;

the first hinged end is hinged to the base plate;

the first sliding end is slidably provided at a bottom of the seat plate;

the second connecting arm is provided with a second hinged end and a second sliding end;

the second hinged end is hinged to the bottom of the seat plate;

the second sliding end is slidably provided at the base plate; and the push rod is configured to extend along the axial direction of the main body to drive the first sliding end to move away from the second hinged end and drive the second sliding end to move away from the first hinged end, so as to unfold the folding assembly; and the push rod is also configured to retract along the axial direction of the main body to drive the first sliding end to move close to the second hinged end and drive the second sliding end to move close to the first hinged end, so as to fold the folding assembly.

3. The plastic electric lift device of claim 1, wherein the clamping part is provided a limiting end and a free end;

the limiting end is rotatably provided at the shaft rod;

a bottom of the seat plate is provided with a stop block; and the stop block is configured to abut against the free end to allow the clamping part to rotate in a direction away from the push rod head, thereby releasing the push rod head from the limiting end.

4. The plastic electric lift device of claim 1, wherein the plastic electric lift device further comprises a hook assembly;

the hook assembly is provided at the base plate; and the hook assembly is configured to hold the seat plate in a case that the folding assembly is in a folded state, thereby securing the seat plate relative to the base plate.

5. The plastic electric lift device of claim 4, wherein the hook assembly comprises a hook and an elastic component;

the hook is rotatably connected to the extension part, and is provided with a hooking end and an adjusting end;

the elastic component is provided at the base plate, and is configured to abut against the adjusting end; and the hooking end is configured to hold the seat plate.

6. The plastic electric lift device of claim 1, wherein a bottom of the base plate is provided with a suction cup.

7. The plastic electric lift device of claim 1, wherein the seat plate is provided with a ramp portion; and the ramp portion is configured to extend in a direction toward a floor.

8. The plastic electric lift device of claim 1, wherein at least one of two opposite lateral sides of the seat plate is provided with an extending plate.

9. A plastic electric lift device, comprising:

a seat assembly;

a folding assembly;

an electric push rod assembly; and a clamping assembly;

wherein the seat assembly comprises a seat plate and a backrest; the backrest is rotatably connected to the seat plate;

the folding assembly is configured to support the seat assembly;

the electric push rod assembly comprises a main body and a push rod; the push rod is partially provided within the main body; the main body is provided at the backrest; the push rod is provided with a push rod head; the push rod head is removably provided at the folding assembly; the push rod is configured to extend and retract along an axial direction of the main body, such that the main body drives the folding assembly to become unfolded or folded, so as to drive the seat assembly to ascend or descend; and the clamping assembly is configured to limit the push rod head to the folding assembly or to release the push rod head from the folding assembly, so as to achieve a removable arrangement of the push rod head relative to the folding assembly;

the folding assembly comprises a base plate and a crisscross arm mechanism;

the crisscross arm mechanism is provided at the base plate;

the crisscross arm mechanism is configured to support the seat plate;

the plastic electric lift device further comprises a hook assembly;

the hook assembly is provided at the base plate; and the hook assembly is configured to hold the seat plate in a case that the folding assembly is in a folded state, thereby securing the seat plate relative to the base plate.

* * * * *